Figure 1:
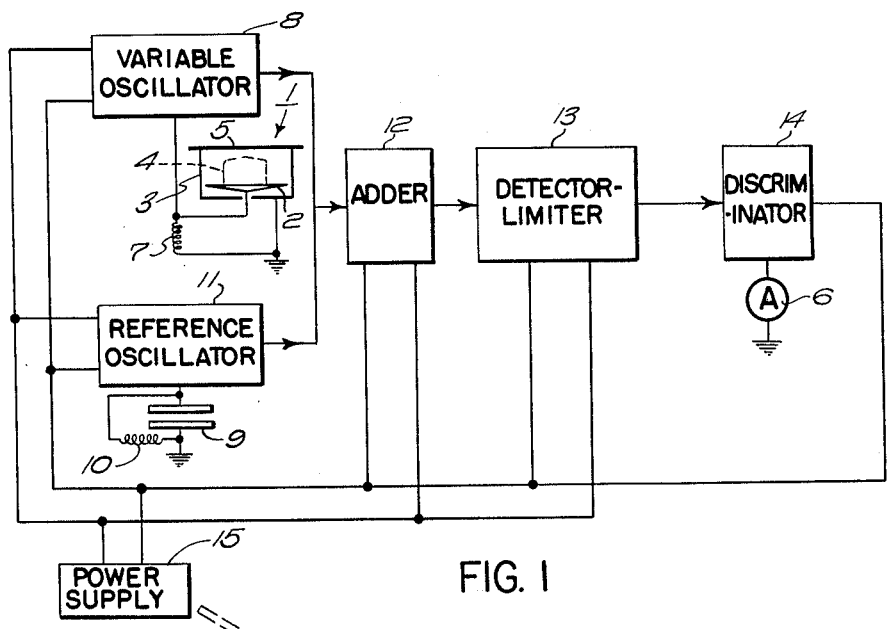

May 14, 1963

S. BREEN ET AL 3,090,004

METHOD AND APPARATUS FOR MEASURING
CAPACITIVITY OF MATERIALS

Filed March 31, 1959

5 Sheets-Sheet 1

INVENTORS
STANLEY BREEN
SAMUEL J. MASON
BY
Dike, Thompson & Bronstein
ATTORNEYS

May 14, 1963
S. BREEN ET AL
3,090,004
METHOD AND APPARATUS FOR MEASURING
CAPACITIVITY OF MATERIALS
Filed March 31, 1959
5 Sheets-Sheet 2

INVENTORS
STANLEY BREEN
SAMUEL J. MASON
BY
Dike, Thompson & Bronstein
ATTORNEYS

May 14, 1963

S. BREEN ET AL 3,090,004

METHOD AND APPARATUS FOR MEASURING
CAPACITIVITY OF MATERIALS

Filed March 31, 1959

5 Sheets-Sheet 3

INVENTORS
STANLEY BREEN
SAMUEL J. MASON

BY

*Dike, Thompson & Bronstein*

ATTORNEYS

May 14, 1963 S. BREEN ET AL 3,090,004
METHOD AND APPARATUS FOR MEASURING
CAPACITIVITY OF MATERIALS
Filed March 31, 1959 5 Sheets-Sheet 4
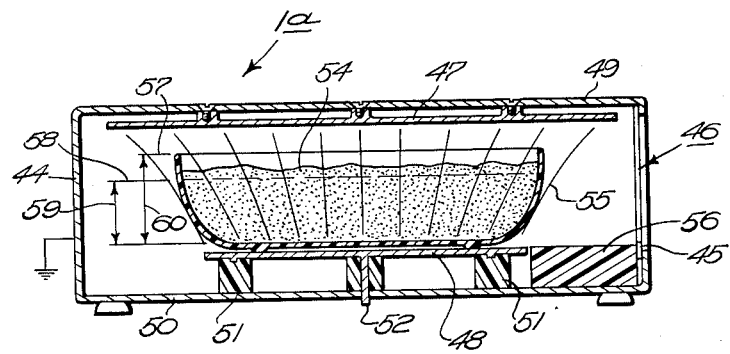
F I G. 10
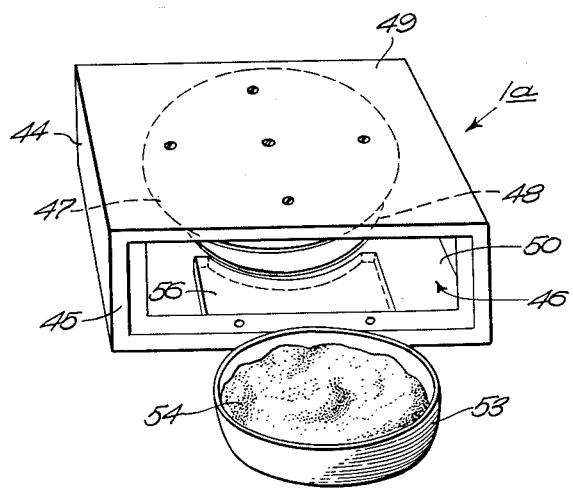
F I G. 11
*INVENTORS*
STANLEY BREEN
SAMUEL J. MASON
BY
*Dike, Thompson & Bronstein*
ATTORNEYS

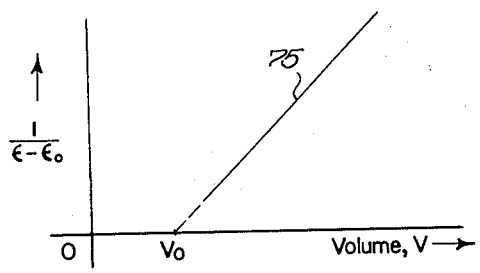
FIG. 13
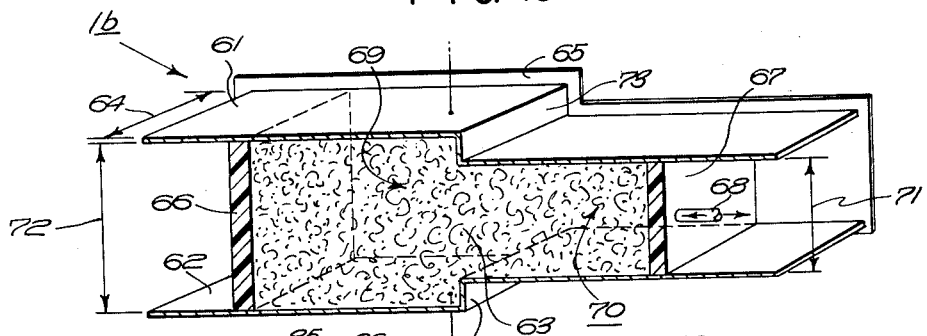
FIG. 12
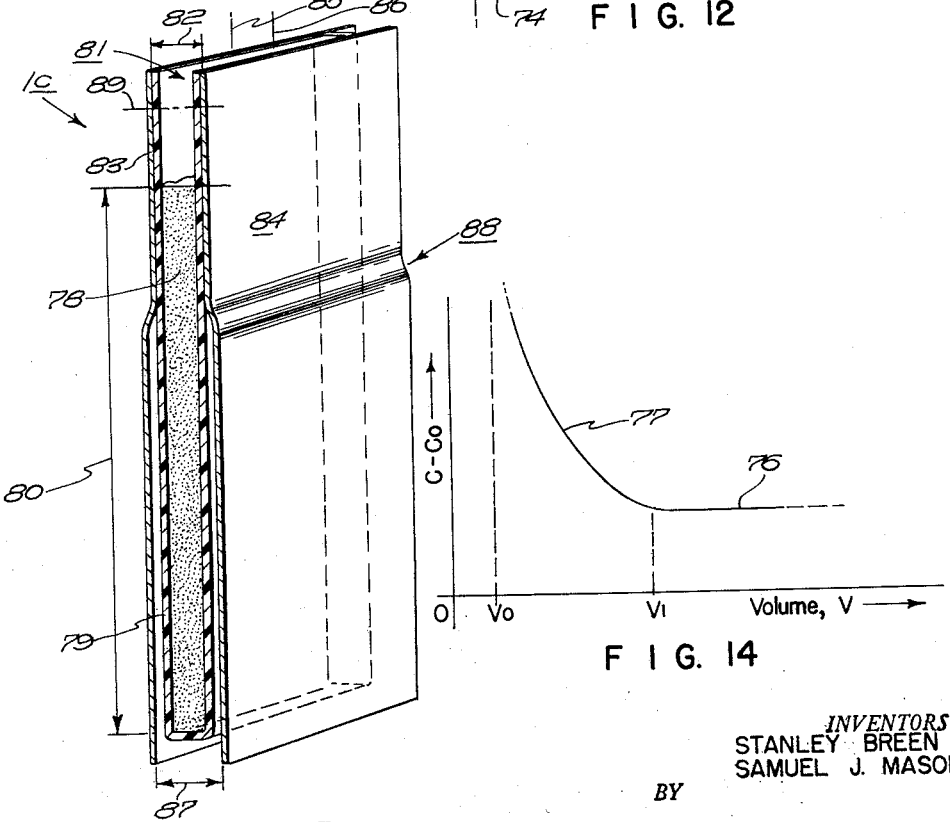
FIG. 15
FIG. 14
INVENTORS
STANLEY BREEN
SAMUEL J. MASON
BY
Dike, Thompson & Bronstein
ATTORNEYS

3,090,004
METHOD AND APPARATUS FOR MEASURING CAPACITIVITY OF MATERIALS

Stanley Breen, Norwood, and Samuel J. Mason, Newton, Mass., assignors to Forte-Fairbairn Inc., Norwood, Mass., a corporation of Delaware
Filed Mar. 31, 1959, Ser. No. 803,129
17 Claims. (Cl. 324—61)

The present invention relates to the detection of properties of substances as they effect electrical capacitance, and, in one particular aspect, to improved high-precision capacitive detectors of moisture content which are rendered insensitive to variations in densities of measured substances.

This application is a continuation-in-part of our co-pending application Serial No. 721,194, filed March 13, 1958, for "Method and Apparatus for Measuring Capacitivity of Materials," now abandoned, assigned to the same assignee as that of the present application.

Accurate measurement of moisture content of materials is a highly important prerequisite to successful control or processing in a number of industries, such as those involving textiles, chemicals, foodstuffs, and the like. Composition, workability, and storage factors may be largely influenced by moisture content, for example, such that it can involve costly error to proceed with weaving and spinning operations in textile manufacture, or to mix or chemically combine ingredients in other manufacturing operations, without first carefully establishing the moisture content of the stock involved. It has of course been known heretofore to measure this factor in several ways, which may include the relatively elementary practice of baking and weighing, or which, preferably, may exploit electronic detection apparatus.

The latter technique is generally well suited to meet demand for swift and uncomplicated measurement, and it is to such electronic detection apparatus, in significantly improved form, that the present teachings are addressed. Highly satisfactory results have been found attainable with certain equipment responsive to variations in capacitivity of tested material, as evidenced by measurements characterizing the capacitance of a detector unit in the form of a capacitor wherein the tested material serves as dielectric. Capacitivity of a material is a function of the dielectric constant it exhibits by virtue of propertes such as moisture content, dimensions, and other composition, and knowledge of certain of these properties can lead to conclusions about others. However, it has been found that a heretofore neglected density factor can occasion error where all other factors are unaltered, and that this source of error may render measurement apparatus somewhat inaccurate. To our knowledge, prior detectors and testing practices with them are incapable of minimizing such deficiencies in the measurement of materials in certain commercial forms.

Accordingly, it is one of the objects of the present invention to provide improved capacitive test apparatus for the precision measurement of properties of material, including moisture content, wherein compensations for density variations are automatically introduced.

It is an additional object to provide improved testing equipment of simple construction operating on capacitor principles to detect accurately the moisture content of commercial lots of materials having different densities.

A further object is to provide a method for sensitively detecting moisture content properties of materials, as exhibited by capacitivities thereof, in which electric fields are critically distributed in compensation for density variations of evaluated materials.

Another object is to provide precision capacitor test cell apparatus for measurement of capacitivity of materials, such as balls of wool top, having electrodes constructed to generate a non-uniform electric field distributed in a pattern compensating for undesired effects of density variations.

It is a yet further object to provide improved capacitor test cell apparatus adapted to have pulverulent and granular materials in differing states of packing control cell capacitivity independently of density and packing factors.

By way of a summary account of practice of this invention in one of its aspects, we provide in an electronic moisture detection system a capacitive test cell in the general form of a hollow container of relatively large dimensions accommodating within it a commercial size quantity of material, such as a ball of wool top. The latter may comprise a 15–20 pound unwoven rope of combed wool wound into a generally cylindrical shape having a diameter of about 15 inches and a height in the vicinity of 14 inches, one or both ends being somewhat conical. One of the two capacitor electrodes, which is maintained at a ground potential in the system, provides an electrically continuous outer shielding surface interrupted only by the cable connection for the remaining electrode disposed within it. A portion of this same outer electrode structure is also constructed as a movable lid or cover for the assembly to permit access to be had to the interior thereof. Within the outer electrode structure, a second and inner electrode is mounted in an insulated relationship thereto and with critical separations from certain of the inner surfaces of the outer electrode structure. The inner electrode preferably possesses one concave conical surface having a small altitude in relation to its diameter, whereby the aforesaid wound wool material may be readily centered therein, and these concave surfaces are disposed in a predetermined spaced relationship to cylindrical inner walls of the outer electrode which yields an electric flux field having intensities varying progressively with distances from the apex of the conical surface along the altitude thereof. This field pattern, created in the region accommodating the evaluated material, is promoted by fringing fields between the electrode surfaces, that is, by fields which do not travel in straight lines between the opposite surfaces and which result, in part, from the divergence of field lines spreading from a smaller electrode surface to a larger one. With this type of field established, the capacitivity of the evaluated sample is measured in a first position and then in an inverted position within the cell, with the two measurements being averaged to eliminate effects of non-uniform density and, particularly, moisture distributions.

This averaging also compensates for any dimentional asymmetry of samples being evaluated.

Figure 2:
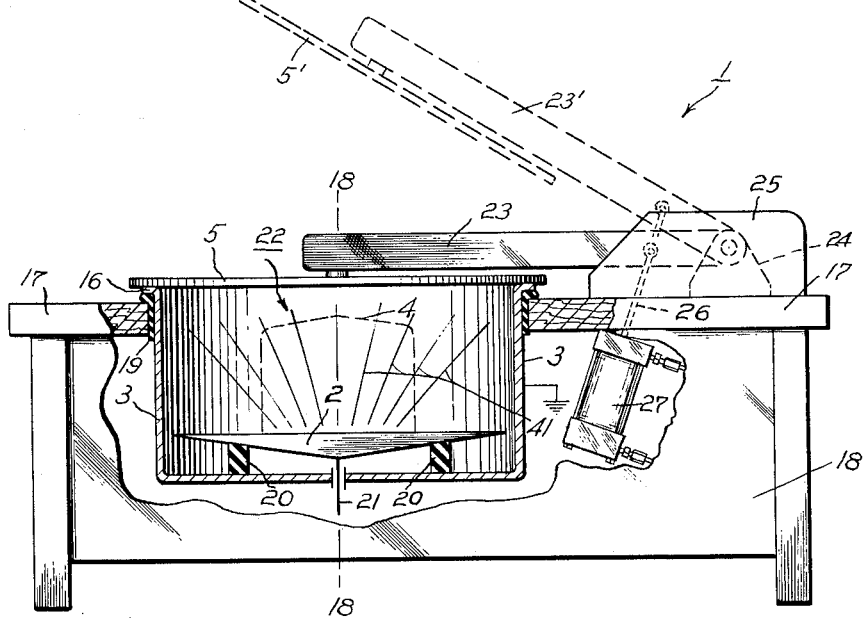
Figure 3:
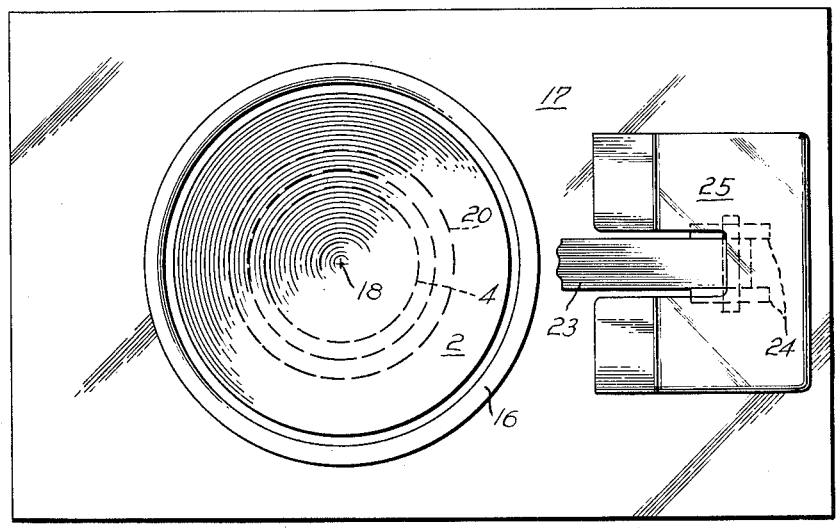
Figure 4:
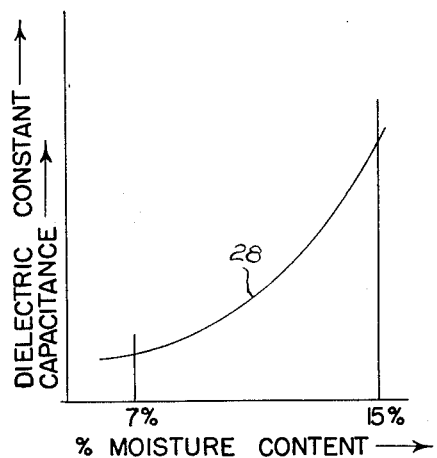
Figure 5:
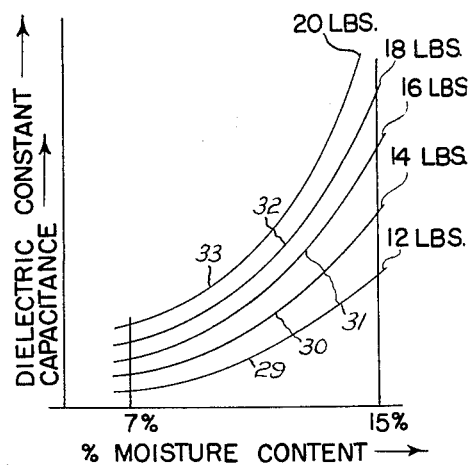
Figure 6:
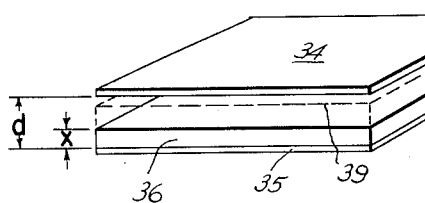
Figure 7:
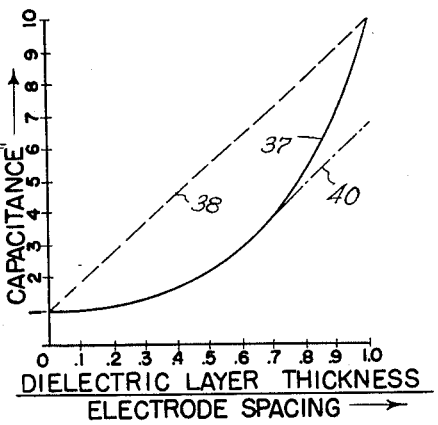
Figure 8:
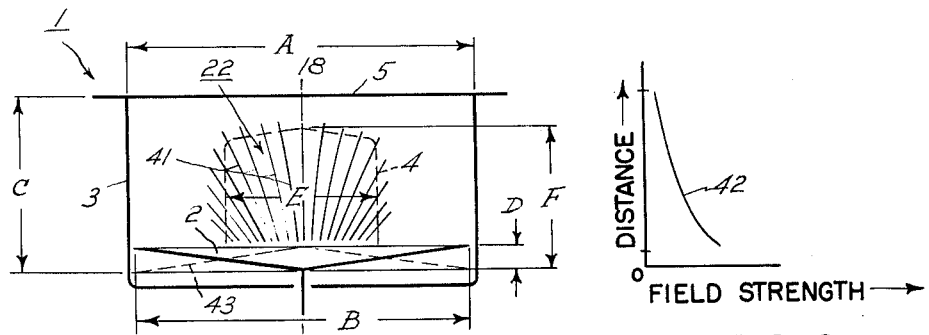
Figure 9:
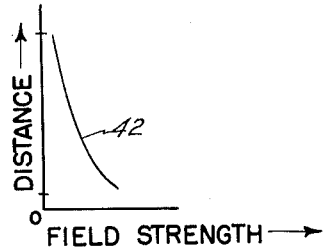

Although the features of this invention which are believed novel are set forth in the appended claims, greater detail of the invention in its preferred embodiments and the further objects and advantages thereof may be readily comprehended through reference to the following description taken in connection with the accompanying drawings, wherein:

FIGURE 1 depicts in a partly schematic and partly block-diagrammed form one moisture detection system wherein the teachings of the present invention may be practiced advantageously;

FIGURE 2 provides a cross-sectioned side view of one preferred form of capacitor test cell apparatus wherein a distributed electric field of desired intensity patterns is produced;

FIGURE 3 is a plan view of the FIGURE 2 apparatus emphasizing the circular symmetry of portions thereof;

FIGURE 4 graphically represents the relationships of capacitance and dielectric constant to percentage moisture content of materials measured with certain forms of detectors;

FIGURE 5 illustrates a family of characteristic curves for balls of wool top of various weights;

FIGURE 6 portrays schematically a capacitor having different dielectric layers therein and serving as an aid to the understanding of density factor complications;

FIGURE 7 plots the relationship of capacitance to thickness of one layer of dielectric in certain capacitors;

FIGURE 8 includes a simplified schematic representation of a test cell structure;

FIGURE 9 plots a distance versus field strength characteristic for the FIGURE 8 cell illustrating progressive field strength variations for compensation purposes;

FIGURE 10 is a transverse cross-sectional view of an improved capacitor test cell arrangement particularly adapted for use in measurements of capacitivity of pulverulent and granular materials and the like which are of non-standard density;

FIGURE 11 provides a pictorial illustration of the test cell equipment of FIGURE 10, with a removable container for evaluated samples illustrated in displaced relation to the cell plates;

FIGURE 12 is a longitudinal cross-section of a capacitor test cell having a special constriction and adjustable dielectric plug for measurement of capacitivity of samples of materials of different density;

FIGURE 13 plots variation of a capacitance characteristic with volume for a fixed-weight sample of dielectric material;

FIGURE 14 illustrates a characteristic curve of differential capacitance versus volume for a test cell such as that of FIGURE 12; and FIGURE 15 is a cross-sectioned pictorial representation of an improved test cell which measures capacitivity of certain materials substantially independently of density over a significant range of densities.

One advantageous arrangement for the measurement of moisture content of bulk materials with test cells produced in accordance with the present teachings is represented in a partly schematic and partly block diagram in FIGURE 1 of the drawings. A capacitive test cell 1, having an inner electrode 2 in critical relationship to a surrounding grounded outer electrode 3, is adapted to receive a quantity of material 4 when the cover portion 5 is open, and the effect of the material 4 upon the capacitance of cell 1 is characterized by the output indications of instrument 6. Capacitive test cell 1 is illustrated in a paralleled coupling with an inductance 7 to provide a frequency-controlling circuit for a variable oscillator 8, and these elements find their counterparts in a reference capacitor 9, inductance 10, and a reference oscillator 11. The output frequency of variable oscillator 8 bears a relationship to the dielectric constant of the material between the electrodes of cell 1, and the frequency of the output signals from reference oscillator 11 is established by reference capacitor 9 which is essentially fixed though adjustable over a small range to compensate for long term drift effects if they should occur. Addition of the two oscillator outputs, as by an adder circuit 12, yields one component of further output signals substantially equal to the differences between oscillator frequencies and preferably in an audio frequency range. Detector-limiter unit 13 accomplishes a demodulation which results in a signal of frequency substantially equal to the difference in oscillator frequencies, and amplitude errors are eliminated in a limiting operation. The output of detector-limiter 13 is thus found to be in the form of pulses of uniform amplitude and periodicities corresponding to the differences in output signals generated by variable oscillator 8 and reference oscillator 11. Discriminator 14, which is preferably of a non-resonant type, is excited by the pulse signal output of detector-limiter 13 to deliver current through instrument 6, in the form of an ammeter, which also becomes accurately related to the aforesaid frequency differences. Power excitation of the various components of the system is preferably derived from a regulated power supply 15 to promote system stability. If desired, details of circuitry which may be employed in a measurement system such as that which has been described may be observed through reference to the copending application of Stanley Breen for "Apparatus and Method for Measuring Capacitivity of a Material," Serial No. 691,269, filed October 21, 1957 and assigned to the assignee of the subject application, issued as U.S. Patent No. 3,012,193.

It will be recognized that apparatus of the foregoing character will yield output indications related to dielectric properties of the material under evaluation in test cell 1. If the variable oscillator and reference oscillator are substantially identical in construction and operating characteristics, and if they are preserved in substantially the same environment, the effects of temperature are rendered negligible, although the measurements will nevertheless be affected by other factors such as: moisture content, distributions of moisture within the evaluated material, dimensions of the material under evaluation, weight of the material, density of the material, and orientation of the material within the test cell. Where it is sought to establish moisture content alone to a high precision, the other influencing factors may occasion some error. Weight and physical orientation may be readily determined and thus virtually eliminated as sources of unknown error, although the distribution of moisture, density, precise size, and physical orientation as it is affected by size, are not readily determinable. In some instances, the evaluated materials are of essentially one density, as in the case of balls of wool top produced by a manufacturer, and measurements can then be made very accurately related to moisture content alone by insuring that all portions of the evaluated material are traversed by a uniform electric flux field in a capacitor test cell. This arrangement proves highly satisfactory in minimizing errors due to non-uniform distribution of moisture within the material. In yet other instances, as where the moisture contents of balls of top of different densities are to be measured, it may be desirable to further heighten precision by automatically eliminating the density factor as a source of errors.

The FIGURE 2 capacitive test cell apparatus incorporates constructional features which achieve compensation for the aforesaid density-induced errors. Referring first to the specific constructional detail illustrated in this figure, it will be noted that these correspond generally to those presented schematically in the test cell 1 in FIGURE 1 and, therefore, the same reference characters are applied to like elements in both figures. Outer capacitor electrode 3 is shown to be in the form of a hollow cylindrical casing closed at the bottom and having a top peripheral flange 16, the top surface of which is adapted to abut with lower edge surfaces of a removable circular cover plate 5. This flanged casing and electrode is set within an accommodating opening in a table or work member 17 which is part of a console-type enclosure 18, a shock-insulating annular support member 19 being provided therebetween. With the cover plate 5 of the outer electrode structure disposed in the illustrated full-line position, the outer electrode structure, which is of electrically conducting material, provides a fully shielded enclosure for the inner and smaller capacitor electrode 2. This inner electrode is of a shallow conical configuration and is oriented with its altitude colinear with the longitudinal cell axis 18—18, the inner electrode 2 further being supported in insulated relationship to outer electrode 3 by way of insulators 20 and having an electrical connection 21 brought out of the enclosure through an opening in the bottom of the outer electrode structure. Dimensioning and configuration of the capacitor electrode elements are critical in respects detailed later herein such that the electric flux field lines in the measurement region 22 occupied by evaluated material 4 possesses a predetermined intensity distribution affording compensation for variations in the densities of samples.

To afford access to the measurement region 22 for the insertion and removal of tested materials, the cover plate portion 5 of the outer electrode structure may be raised by an actuating arm 23. The commercial-size samples may be of substantial proportions, and the entire cell must be correspondingly large, such that power actuation of the cover removal enclosure is advantageous. Accordingly, the actuating arm 23 is mounted for pivotal movement in a support bracket 24 within an enclosure 25 under control of a piston shaft 26 reciprocated by a pneumatic cylinder and piston assembly 27. In the elevated position illustrated in dashed-line outline, with the reference characters of elements distinguished by single prime accents, the loading and unloading operations may be readily executed. The plan view of this same apparatus in FIGURE 3 provides further clarification of the preferred configurations and arrangements of elements.

In a know form or capacitor cell for measurement of moisture content of balls of wool top, such as a parallel electrode cell or one of another configuration which yet establishes a substantially uniform electric flux field comprised of parallel field lines in the test region, the relationship of capacitance or dielectric constant versus percentage moisture content of the tested samples of a single given size and weight may generally be plotted as a non-linear one corresponding to curve 28 in FIGURE 4 over a range of 7 to 15 percent moisture content, which is of particular interest. This experimentally derived non-linearity supports the pertinent theory that the moisture content of wool-water mix should not only increase with the addition of water, the dielectric constants of wool fiber and water being about 4.2 and 80 respectively, but should increase by a progressively larger increment as neighboring water molecules produce certain polarizing effects upon one another. A uniform field in the capacitor cell may to a certain extent aid in minimizing errors which could otherwise result, and which could not be overcome by system calibration, due to uneven moisture distribution in the measured samples and due to the non-linear relationship between dielectric constant and moisture content. With samples of one fiber and differing weights, a set of characteristic curves of the aforesaid type may be plotted from empirical data, and, since the measurement of weight is simply performed with common weighing devices, the moisture content of materials having measured capacitivity may be readily established. By way of example, the curves 29 through 33 in FIGURE 5 are generally characteristic of balls of wool top weighing 12, 14, 16, 18 and 20 pounds, respectively. While particular curves of this characteristic type are of value in the evaluation of samples of essentially given size and density, they possess error where the latter factors are variable.

This perplexing measurement error is detected in those cases where balls of top of one predetermined weight and with known uniform and fixed moisture content nevertheless produce distinctly different capacitivity responses in a measurement system. It has been discovered that such errors bear a relationship to the characteristics realized as the "filling factor" of a capacitor is altered, and automatic compensation has been achieved taking cognizance of this relationship. By way of explanation, reference is invited to the FIGURE 6 illustration of a simple capacitor including parallel electrodes 34 and 35 spaced over a distance $d$ and including a dielectric sheath 36 of dielectric constant $k$ therebetween having a thickness $x$ which is less than half the dimension $d$. The balance of the space between the electrodes or plates 34 and 35, over the distance $d-x$, is assumed to be occupied by air or space of unity dielectric constant. Capacitance, C, is then found to be proportional to the plate area divided by $d-x+x/k$. This relationship is expressed graphically in FIGURE 7 wherein capacitance is plotted against the dimensionless filling factor, $x/d$, to yield the non-linear curve 37. The variation in capacitance does not at all resemble a linear relationship 38, which has been depicted in dashed-line form for purposes of contrast, and it will be observed that with increasing thickness of dielectric 36 in FIGURE 6 the exhibited capacitance will thus increase more and more markedly. Small variations in the relatively large dielectric layer thickness, such as slight changes in thicknesses of the layer represented by dashed-lines 39, would therefore occasion appreciable variations in cell capacitance. It will be seen that in terms of measurements of balls of wool top, this signifies that where the balls vary in height relative to the height of the electrode spacing in the measurement region, discrepancies in ball height can produce undesired capacitance variations not attributed thereto but to moisture content instead. Assuming that the dielectric layer 36 is altered in thickness not by addition of more of the same material, but, rather, by making it less dense and/or including minute air spaces within it, the dielectric constant will not be fixed and the plot of capacitance versus filling factor will depart from that of curve 37 and assume a more flattened form similar to that of double-dashed curve 40 in FIGURE 7. With reference to wool top, dielectric constant may be shown to decrease as density decreases in the aforesaid manner, and approximately in accordance with the following expression:

$$\frac{e-e_0}{e+2e_0}=\frac{R}{R_0}$$

where
$e$=dielectric constant of wool-water material,
$e_0$=dielectric constant of free space,
$R$=density of wool-water material, and
$R_0$=density of wool-water material compressed to such extent that the dielectric constant would be infinite.

The decrease in dielectric constant with decreasing density is not in the same relationship as changes of capacitance with filling factor in a capacitor, however. Although the effective dielectric constant of a given weight of a given material decreases as it occupies a larger volume, the decrease caused thereby in capacitance of a capacitor of uniform field does not occur as rapidly as the increase in capacitance due to increased volume of the filled part of the capacitor. It will be understood, therefore, that a plurality of variables of different and non-linear characteristics may be present in moisture measurement systems, including capacitance versus moisture content, capacitance versus filling factor, and dielectric constant versus density, and that their differences are not identifiable and separable in measurements and do not have mutually cancelling effects upon errors in measurements. The uncertainties in measurements can be resolved satisfactorily in a test cell such as that portrayed in FIGURES 2 and 3, and by following certain measurement practices, inasmuch as such apparatus intentionally avoids the production of a wholly uniform electric flux field and creates in lieu thereof a special field pattern wherein intensity varies in the test region between cell electrodes. A desired effect is produced when the electric field of the capacitor is rendered weaker in a volume of the test region which is occupied as the tested material increases in volume. Positioning, configuration, and dimensioning of the test cell elements control the production of fields which accomplish the desired self-compensation, and one satisfactory arrangement in the case of cell 1 is set forth in FIGURE 8. Hollow cylindrical outer electrode 3 is there of an inner diameter A of about 35 inches and the inner conical electrode 2 is of a slightly smaller diameter B equal to about 32.5 inches. Dimension C from the apex of the concave conical electrode to the under electrode surface of cover 5 is of the order of 16 inches, and the altitude D of the shallow right conical electrode itself is about 2 inches. As was noted earlier, a typical ball of wool top 4 possesses a diameter E and length F from end to end of about 15 and 14 inches respectively. Other dimensions are non-critical insofar as the production of force lines within the measurement space 22 is concerned. The electric field flux represented by lines 41 in both FIGURES 2 and 8 illustrate a divergence thereof between the upper surfaces of inner electrode 2 and the inner surfaces of outer electrode 3, including its outer plate 5. Intensities of strengths of this field in planes perpendicular to axis 18—18 and intermediate the cover 5 and inner electrode 2 are found to vary in the manner represented by the distance versus field strength curve 42 in FIGURE 9. In this plot, distance is that distance of the aforementioned measurement plane from the apex of the shallow concave conical inner electrode, and the field strength is shown to become progressively weaker as this distance increases. Accordingly, an evaluated sample 4 traversed by the diverging field exerts more of an influence upon exhibited cell capacitance due to its bulk in the lower portion of the cell, where the electric field is more intense, than it does in the upper portion of the measurement region 22 where the field 41 is of relatively weak strength. Field flux lines 41 are somewhat symbolic and are not intended to represent the exact and only paths of flux lines contributing to intensities at various positions. However, the intensity distributions are clarified by such a representation, which is in general agreement with theory concerning the existence and course of flux lines between capacitor electrodes or plates. An important aspect of this field pattern, which is not specifically shown in the illustrations, lies in the uniformity of the field distributions in radial directions about the axis of symmetry 18—18. That is, the lines of flux in each plane transverse to axis 18—18 are about equally spaced and distributed in the critical measurement region 22 occupied by the tested material 4. Because of this field uniformity in the radial directions, any non-uniformly distributed moisture content is sensed without error due to field distributions in lateral directions. Symmetry, such as the circular symmetry of cell 1 about longitudinal axis 18—18, is thus advantageous, although in other cell constructions having different electrode configurations, there may be no such symmetry while a lateral uniformity of field is yet realized in the measurement space. Such a distribution may be occasioned through use of cell electrodes having surfaces extending over at least certain distances beyond the lateral limits of the measured material. In cell 1, for example, the conical inner electrode 2, which is the smaller of the two electrodes, possesses a base diameter B just over twice the expected diameter E of material 4, the two-to-one ratios of this dimension being found desirable to insure the aforesaid lateral uniformity.

The relatively weakened electric flux field appearing near the top of the measurement space 2 is lowered in relationship to the strength of the field in the lower portion of this space, the exact relationship being one which can be set by appropriate proportioning of dimensions A through D. Inner cylindrical side walls of the shielding outer electrode 3 assist in the production of the desired field strength distribution in that they cause electric flux lines to radiate thereto from the inner electrode 2 in the manner of the "fringing" lines commonly wasteful and sought to be avoided in other capacitor constructions. Whereas the vertical positioning of a sample, such as ball 4, in a uniform-intensity flux field is not significant in measurement, the troublesome errors there being dependent upon the "filling factor" irrespective of what the vertical positioning of the sample may be, such positioning could, however, be a possible error source in the present apparatus wherein the ball should be recessed to the lowermost cell position at which the fields of most significant intensity appear in the cell. Electrode 2 is thus preferably in the illustrated configuration of a shallow concave conical member, into which the sample may be readily recessed to a small extent, this arrangement having the further advantage that the sample is also caused to be centered at the optimum radial measurement position within the cell. A cone in which the sides form an angle of about 166 degrees at the apex serves not only to provide this desired positioning but produces as well a highly satisfactory field distribution in the case of cell unit 1. With the uppermost part of sample 4 disposed in a field of relatively weakened strength, the absolute heights of samples now become less critical inasmuch as the capacitor is less sensitive to changes in the "filling factor" in this upper region. This uniquely permits moisture content measurement of balls of different heights without knowledge of the absolute values thereof, the weights alone being separately measured to permit evaluation of the output readings in light of predetermined characteristic curves for samples of various weights. Variations in radial or lateral dimensions of the samples are not serious sources of error, because the measurement field is laterally uniform in the respects detailed earlier herein. On the basis of the present teachings, fields of the required characteristics may also be generated in cell units having modified electrode constructions, such as the convex inner conical electrode 43 depicted in dashed lines in FIGURE 8, or such as a wholly flat inner electrode from which flux lines are of a highly fringing character in spreading outwardly to a larger and, where desired, an appropriately shaped outer electrode.

However, where moisture distributions are uneven in any sample, as is commonly the case, it may occur that significant moisture concentrations appear in the very portions of the sample which are disposed in the intentionally weakened measurement field, and the capacitance measurements are thus not accurately related to the moisture content which it is the principal object to sense precisely. Therefore, it may not be sufficient only to generate a measurement field of lateral uniformity and diminishing intensity across a measurement space and to measure capacitivity of a sample disposed with the principal bulk thereof in the flux of greatest intensity. To overcome the possible measurement uncertainties due to uneven moisture distribution and dimensional asymmetry, the measured sample is evaluated at least twice, with the second evaluation performed while the sample is inverted about its axis substantially normal to the electrodes. In the case of ball 4, the second measurement is made with the ball inverted about axis 18—18, for example. Thereafter, the two measurements are averaged, and the average value taken to represent the moisture content of the sample of known weight. It is found that this process yields accurate moisture content information for a sample.

Variations in density which are likely to introduce measurement errors can be particularly troublesome in the case of powdered or granular materials. It will be apparent that a given weight of a substance such as powdered dried milk, for example, may occupy a relatively large volume when in a light fluffy distribution and a considerably reduced volume when in a firmly packed condition. This substance will then exhibit different capacitivities when inserted between like capacitor plates of a testing system under the different density conditions, for reasons which have already been discussed with reference to the illustrations of FIGURES 6 and 7, and the more tightly compressed substance will yield the lower capacitivity measurement. Where it is sought to measure only a factor such as moisture content, the further variable introduced by an unknown filling factor or density prevents needed accuracy from being realized. The test cell apparatus of FIGURES 10 and 11 provides a highly satisfactory solution, however, by way of critically proportioned electrodes which establish a non-uniform electrostatic field automatically compensating for differences in the packing of evaluated samples in a special cavity. Cell 1a, which may be coupled into the circuit of FIGURE 1 in lieu of the test cell 1, includes a grounded outer casing 44 which is of generally flattened rectangular shape and closed on all sides except a front 45 which has a central opening 46 providing access to the interior of the casing. Two circular capacitor electrodes 47 and 48, of different diameters, are disposed in a spaced parallel relationship within the casing, the larger flat plate electrode 47 being supported by and electrically grounded to the casing top wall 49, and the smaller plate being coaxially disposed nearer the casing bottom wall 50 upon which it is supported in a spaced insulated relationship by insulators 51. Lead 52 for insulated plate 48 is brought through the casing at a suitable position for coupling into the measurement circuitry.

Materials which are to be evaluated are placed within a cavity defined by a cooperating container 53 which is of electrically insulating material and which has proportions not only enabling its insertion into and removal from the space between the electrodes but also confining the measured substance, 54, to within predetermined limits in relation to the distributed capacitor field of the cell. Because of the differences in electrode diameters, and because of the effects of the inner conductive walls of casing 44 in developing fringing flux with the smaller electrode 48, the electrostatic field distribution intermediate parallel plates 47 and 48 is non-uniform in the direction of their spacing. Flux lines 55 in FIGURE 10 characterize the field divergence in the vertical direction, although it should be understood that the field between the plates is essentially symmetrical and uniformly distributed in each plane transverse to this direction and parallel with plates 47 and 48. Container 53 possesses a fixed dielectric constant when constructed of an appropriate stable insulating material, such as polystyrene, and its effect upon capacitance of the test cell is known and is unvarying. At its base and upper rim, the diameters of the container are less than the diameters of electrodes 48 and 47, respectively, whereby the diverging flux field lines 55 thread through all portions of the tested material 54. The perspective view in FIGURE 11 illustrates the recessing of electrodes 47 and 48 centrally into the interior of casing 44 and inwardly of the access opening 46, which insures that the flux field will not become distorted by influences outside of the casing. However, the positioning of container 53 atop the smaller slightly-elevated plate 48 is likely to be hampered as a consequence of the spacing of front 45 from plate 48, and the insertion and removal of the container is facilitated by adding a guide shelf 56 of a low and stable dielectric material, such as polystyrene, extending between the casing front and the lower electrode. Top surfaces of this electrode 48, and the guide 56 lie in a common plane such that the container may be slid into and out of measurement position without difficulty. It should be understood that in some constructions the function of the upper electrode 47 may be served by the conductive casing top 49 itself, provided it is of suitable proportions and stiffness.

Because of the upward divergence of electrostatic flux lines 55, the field in the vicinity of upper electrode 47 is less concentrated than that near lower electrode 48. Therefore, as a given-weight sample of material 54 is packed from a first level 57, in relation to electrode 48, to a second lowered level 58, more of the material occupies a volume within stronger field and achieves compensation for loss of capacitivity due to reduced size of the sample. Changes in volume are not caused by intentional tamping or packing alone, of course, but are also to be expected as the result of settling, handling and other accidental influences. By way of example, a cell achieving precise compensation for a practical range of sample volume changes is produced employing coaxial parallel upper and lower electrodes 47 and 48 which are eight and five inches in diameter, respectively, and which are spaced 2.1 inches apart. Suitable proportions of polyethylene container 53 for use in this assembly include bottom and top diameters of 4¼ and 5¾ inches, respectively, such that the cavity is generally frustro-conical in shape. A 250 gram sample of powdered dried milk was found to be of a first depth 59 of about 1¾ inches in a light fluffy condition, and, when packed somewhat, was found to have a lower depth 60 of but 1⅜ inches. Upon measurement of exhibited capacitivity of this cell with the sample in these two states, there was no significant variation detected. Repetition of the tests with a cell having elecrodes of the same size, which produce a wholly uniform electrostatic field therebetween, occasions measurements which are of significant difference, however, and which involve error attributable to density.

In the embodiment of FIGURES 10 and 11, the principal dimensional variation of a sample due to differences in density occurs in a direction which is generally parallel with the field directions from plate to plate. It is not essential that one or both of these plates be perfectly flat, of course, since satisfactory diverging fields can also be created with electrodes having other shapes, such as spherical or conical configurations. In further useful embodiments, however, highly accurate compensation for complicating density factors is achieved where the principal dimensional variation of a sample due to differences in density occurs in a direction transverse to the cell's electrostatic field. If a uniform-field parallel plate capacitor be considered, with a compressible dielectric substance between plates, and if the sample is compressed in direction parallel with the plates and thus normal to the flux lines, the capacitance increases. This increase results because the capacitance change due to increased effective dielectric constant of the more firmly packed sample increases at a non-linear rate faster than the reduction in capacitance due to decrease in the volume of lesser-density sample. Inasmuch as the parameter sought to be measured is moisture content or another factor other than density, the aforesaid increase in exhibited capacitance leads to troublesome measurement errors. FIGURE 12 depicts one form of capacitor cell construction, 1b, which avoids such errors, however, the cell being one which is suitable for use in place of test cell 1 in a measurement system such as that of FIGURE 1.

The cell 1b includes two spaced electrically conductive electrodes 61 and 62 which cooperate in developing an electrostatic flux field between them in regions to be occupied by a somewhat compressible sample of dielectric material 63. In the longitudinally cross-sectioned pictorial view of FIGURE 12 the cell width is not fully depicted, although it should be understood that the two conductive plates 61 and 62 are of equal width throughout, such as a width twice that designated by reference character 64. Each of the cell sides unbounded by the conductive plates themselves is closed by a side panel of insulating material, such as the panel 65, for the purpose of confining the sample to the regions between electrodes. The two ends of the cell are closed by a fixedly-position dielectric plug 66 and a movable dielectric plug 67 which is adjustable in the longitudinal directions of arrows 68. The capacitor construction defined by electrodes 61 and 62 is one wherein there are essentially two communicating rectangular measurement cavities, 69 and 70, the latter being formed by parts of the electrodes having a closer parallel separation, 71, than the separation 72 of those parallel parts of the electrodes bordering the larger cavity 69. Conductive wall elements 73 and 74 join the portions of the electrodes 61 and 62, respectively, which are displaced to provide the aforesaid differences in spacings.

When certain constructional requirements are satisfied, the test cell apparatus of FIGURE 12 functions to exhibit capacitivity of sample 63 substantially independently of longitudinal orientation of movable plug 68 over a wide range of its permissible adjustment. This signifies that the resulting measurements, such as those of moisture content, are likewise substantially independent of density variations which may result from inaccurate positioning of the adjustable plug and are therefore more precise than would otherwise be the case. In this connection, it should be observed that the increase in capacitance of this cell due to insertion of the sample of material 63 is given by the expression:

$$C - C_0 = (\epsilon - \epsilon_0)\left(\frac{V_1}{S_1^2} + \frac{(V-V_1)}{S_2^2}\right)$$

where
$C$=capacitance with sample in cell,
$C_0$=capacitance without sample in cell,
$\epsilon$=dielectric constant with sample in cell,
$\epsilon_0$=dielectric constant without sample in cell,
$V_1$=volume of cavity 69,
$V$=volume of cavity 69 and cavity 70 combined,
$S_1$=spacing 72, and
$S_2$=spacing 71.

It is known that if the volume of a fixed weight sample is varied from the smallest possible theoretical value, $V_0$, the effect upon dielectric constant thereof will vary in the characteristic manner expressed by the curve of FIGURE 13, wherein volume, V, appears along the abscissa, and the reciprocal of differences between the dielectric constant under a specific volume condition, $\epsilon$, and under minimum volume condition, $\epsilon_0$, appears along the ordinate. The slope of the curve 75, which may be represented by the term $m$, is then involved in the relationship of these factors as follows:

$$\frac{1}{\epsilon - \epsilon_0} = m(V - V_0)$$

This slope, $m$, characterizes the parameters of interest in measurement where the weight, but not volume, of evaluated samples is fixed. Substitution of $$\frac{1}{m(V-V_0)}$$

for $(\epsilon - \epsilon_0)$ in the first equation yields:

$$C - C_0 = \frac{\frac{V_1}{S_1^2} + \frac{(V-V_1)}{S_2^2}}{m(V-V_0)}$$

and, if electrode spacings are selected in accordance with the following relationship:

$$\frac{S_2}{S_1} = \sqrt{1 - \frac{V_0}{V_1}}$$

then $$C - C_0 = \frac{1}{mS_2^2}$$

The capacitance variations thus become substantially independent of the total volume V, provided the volume $V_1$ of cavity 69 is filled. Moreover, where volume $V_1$ is considerably larger than $V_0$, as is commonly the case with measured materials of relatively low density, then the difference between spacings 72 and 71 need not be large. Plotting $C - C_0$ against volume, V, the characteristic curve of test cell performance becomes generally that of FIGURE 14, wherein the capacitance differences with sample volumes in excess of volume $V_1$ of cavity 69 are substantially unchanging, along curve portion 76. Reduction in sample volume below this amount, as by compression of the sample wholly into cavity 69, occasions increasing exhibited capacitance having the characteristic shown by curve portion 77.

Electrostatic flux lines in the test cell 1b extend transversely to the direction of sample compression, rather than parallel to it, and the closer plate spacing 71 in the region of cavity 70 occasions a somewhat more intense electrostatic field than appears through cavity 69. This characteristic is of particular advantage in a test cell wherein the measured sample, such as a pulverulent material, is of a relatively large volume and mass needed to obtain optimum statistical results and thus tends to settle or pack even under its own weight. In the test cell 1c of FIGURE 15, for example, the sample material 78 is present in the polystyrene insulating container 79 to a rather large depth 80 from the bottom. The insulating container is elongated and is oriented such that its elongation extends in the vertical direction under conditions of use, the top end 81 being open to admit the sample material. Width of the polystyrene container is uniform throughout, and the same is true of its thickness 82. Identical plate electrodes 83 and 84 are disposed one on each of the wider sides of the container, in spaced insulated relationship to one another, and are adapted for coupling into a moisture content measurement system such as that of FIGURE 1 by way of coupling leads 85 and 86, respectively. The plate electrodes are both preferably somewhat wider and longer than the container, as illustrated, whereby the electrostatic fields through the sample material 78 is not rendered non-uniform by fringing fields across the electrode edges. For the aforementioned purposes of producing a desired weaker field through the lower portion of the sample, the plate electrode spacing 87 is caused to be greater than the top spacing 82, as by the illustrated outward bowing of the plates at an intermediate level 88. According to one suitable proportioning of elements, the plates 83 and 84 may each be about 14 inches high and 8 inches wide, and may have a top spacing 82 of one inch which increases to a bottom spacing 87 of 1¼ inches. The illustrated bowing of electrodes may be obviated through substitution of a linear taper in plate separation from top to bottom, with satisfactory results. Sides of container 79 in this cell are parallel, rather than conforming to the lower plate separation, and the sample is confined by the container to width and thickness limits of 6¾ inches and ¾ inches, respectively. A constant-weight sample of material 78 in the form of granular plastic acrylic material may occupy a depth 80 of about 11 inches in a packed condition and may rise to a level 89 which is 12½ inches above the bottom of the measurements container when in a light fluffy state. No significant difference in cell capacitivity is observed within this useful range of sample heights.

It is not essential that the container 79 be fixedly attached to the electrodes 83 and 84, and it is advantageous to have the container removable from and accurately returnable to position between the electrodes for filling and cleaning operations. It is desirable to have a relatively close spacing between electrodes, thereby to secure large capacitance, and the electrode plates and container are consequently made in substantial width, relative to thickness, for the added purpose of enabling the cell to accommodate ample amounts of the evaluated material.

Practice of this invention is not limited to the particular mechanisms illustrated, it being understood that the foregoing description of preferred embodiments has been presented by way of explanation rather than limitation, and those skilled in the art will recognize that various modifications, substitutions and combinations may be made without departure either in spirit or scope from the invention in its broader aspects.

What we claim and desire to secure by Letters Patent of the United States is:

1. A capacitor test cell adapted to receive quantities of finely-divided dielectric substances and to be coupled into a measurement system for evaluation of dielectric characteristics of said substances, comprising first and second capacitor electrodes having conductive electric flux generating surfaces of different areas, means mounting said surfaces in spaced insulated relationship to one another with the smaller of said surfaces in a lower position, a hollow container of insulating material shaped to receive said quantities of said substances and to rest upon said smaller surfaces and between said electrodes, said electrode surfaces having peripheral portions extending beyond said container with the area of said smaller surface proportioned in relation to the area of the larger of said surfaces by an amount occasioning a weaker concentration of said electric flux through said container in the vicinity of said larger surface than in the vicinity of said smaller surface, said mounting means mounting said electrode surfaces symmetrically in relation to said container to promote substantially uniform field flux distributions in directions transverse to direction of field flux concentration through said container, and means for coupling said electrodes for electrical excitation by and control in a frequency controlling circuit in said measurement system.

2. A capacitor test cell adapted to receive quantities of finely-divided substances and to be coupled into a measurement system for evaluation of dielectric characteristics of said substances, comprising first and second capacitor electrodes having conductive electric flux generating surfaces of different areas, means mounting said surfaces in spaced insulated relationship to one another to develop electric field flux in a measurement region therebetween and with the smaller of said surfaces in a lower position, said electrode surfaces having peripheral portions extending beyond said measurement region with the area of said smaller surface being smaller than the area of the larger of said surfaces by an amount occasioning a weaker concentration of said field flux in said measurement region in the vicinity of said larger surface than in the vicinity of said smaller surface, said electrode surfaces being symmetrically disposed about said measurement region to promote substantially uniform field flux distributions in directions transverse to direction of field flux concentrations in said measurement region, a hollow container of insulating material shaped to receive said substances and to rest upon said lower electrode surface between and in symmetrical relation to said first and second electrodes, the hollow interior of said container and substances therein being disposed wholly within said measurement region when said container is rested upon said lower electrode surface, whereby said finely-divided substances gravitate toward said lower electrode surfaces and variations in density of different samples of said substances having the same weight occasion variations in the levels of said substances in said container wholly within the weaker concentrations of said field flux, and means for coupling said electrodes for electrical excitation by and control in a frequency controlling circuit in said measurement system.

3. A capacitor test cell as set forth in claim 2 wherein said first and second electrode surfaces are substantially horizontal and parallel, wherein said container comprises a shallow open dish, and further comprising an enclosure of conductive material maintained at the same electrical potential as one of said electrodes disposed in shielding relationship to the other of said electrodes and having a lateral opening permitting said dish to be inserted into and withdrawn from said measurement region.

4. A capacitor test cell as set forth in claim 3 wherein said first and second electrode surfaces are circular, wherein said dish is of circular cross section, wherein said larger electrode is grounded with said enclosure, and further comprising means mounting said smaller and lower electrode centrally of and in insulated elevated relation to a bottom wall of said enclosure, and a guide shelf of insulating material having a horizontal upper surface coplanar with the upper surface of said lower electrode and extending from the periphery of said lower electrode to the position of said lateral opening, whereby said dish may be slid into and out of said measurement region along said surface of said guide shelf.

5. A capacitor test cell adapted to receive quantities of dielectric substance of different densities and to be coupled into a measurement system, comprising a first conductive electrode of circular configuration, a second hollow conductive electrode having substantially cylindrical inner surfaces, a substantially flat conductive cover plate mounted for closure and removal from one end of said hollow electrode, means supporting said circular electrode within said hollow electrode in an insulated relation thereto with conductive surfaces of said first electrode and cover plate and said cylindrical inner surfaces bordering a substantially cylindrical space larger than that occupied by said quantities of dielectric substance, conductive surfaces of said first electrode bordering said space being smaller than the combined inner conductive surfaces of said hollow electrode and the conductive surface of said cover plate, whereby generated electric field flux is concentrated in the vicinity of said circular electrode and diverges toward said cylindrical inner surfaces and cover plate to a relatively weakened concentration in the vicinity of said cover plate, said electrodes being colinear about the longitudinal axis of said cylindrical inner surfaces to generate field flux of substantially uniform distributions in radial directions, and means for coupling said electrodes into a frequency controlling circuit in said measurement system.

6. A capacitor test cell as set forth in claim 5 wherein said supporting means positions said first electrode in a lowermost relationship to said cover plate, and wherein upper surfaces of said first electrode are of concave shape to support said quantities of dielectric substance.

7. A capacitor test cell adapted to receive quantities of dielectric substance of different densities and to be coupled into a measurement system, comprising a first conductive electrode having a shallow, concave, conical, conductive surface, a second hollow conductive electrode including a separable cover portion and having substantially cylindrical conductive inner surfaces, means supporting said first electrode within said hollow electrode in insulated relation thereto with conductive surfaces bordering a space larger than a void measurement region accommodating said quantities of said dielectric substances, said surfaces of said first electrode being smaller than inner conductive surfaces of said hollow electrode and disposed to have a concentrated field flux within said measurement region in the vicinity thereof diverge to a relatively weakened concentration in the vicinity of said cover portion of said hollow electrode, said supporting means spacing said electrodes symmetrically and in colinear relationship about the longitudinal axis of said hollow cylindrical surfaces to generate field flux of substantially uniform distributions in directions transverse to direction of field flux concentration in said measurement region, and means for coupling said electrodes into a frequency controlling circuit in said measurement system.

8. A capacitor test cell adapted to receive balls of top of different densities within a predetermined range of sizes and to be coupled into a moisture content measurement system, comprising a first capacitor electrode having a shallow, concave, conical conducting surface, a second hollow conductive electrode having substantially cylindrical inner conducting surfaces and including a conductive cover plate removable from one end thereof, means supporting said first electrode within said hollow electrode in an insulated relation thereto and in a lowermost relation to said cover plate with said conical surfaces disposed toward said cover plate across a void measurement region accommodating said balls of top, said conical surfaces of said first electrode being smaller than inner conductive surfaces of said hollow electrode whereby concentrated field flux within said measurement region in the vicinity thereof diverges to a relatively weakened concentration in the vicinity of said cover plate, said supporting means spacing said electrodes by an amount greater than the heights of said balls of top whereby only said flux field of said relatively weakened concentration interact with topmost portions of balls of top resting upon said first electrode in said measurement region and whereby capacitivity of said cell is substantially unaffected by balls of top of different heights, said concave conducting surfaces of said first electrode encompassing at least twice the cross-sectional dimensions of said balls of top to promote field flux of substantially uniform distributions in directions transverse to direction of field flux concentration in said measurement region, and means for coupling said electrodes for electrical excitation by and control in a frequency controlling circuit in said measurement system.

9. The method of measuring moisture content of substances of different densities which comprises generating an electric flux field varying in concentrations progressively through a measurement region from one concentration to a relatively weakened concentration and having substantially uniform distributions in directions transverse to direction of field concentration, positioning each of said substances with a major portion thereof within the field flux of strongest concentrations, measuring capacitivities within said measurement region with each of said substances therein, inverting each of said substances within said region to place in the strongest fields the portions theretofore in the weakened fields, measuring capacitivities within said region with said substances inverted, and averaging the measured capacitivities for each of said substances to charactreize the moisture contents thereof substantially independently of densities thereof.

10. The method of testing dielectric substances of different densities which comprises generating between capacitor electrodes an electric flux field of one concentration near one end of a measurement region decreasing to a relatively weakened concentration near another end of said region and distributed substantially uniformly in directions transverse to direction of field concentration, positioning each of said substances within said measurement region as near as possible to said one end thereof, measuring the capacities between said electrodes, inverting each of said substances within said region to place in the strongest fields the portion theretofore in the weakened fields, measuring capacitivities between said electrodes with said substances inverted, and averaging the measured capacitivities for each of said substances to characterize the dielectric properties thereof substantially independently of density thereof.

11. The method of measuring moisture content of balls of top of different densities which comprises generating in a measurement region between capacitor electrodes an electric flux varying in concentration progressively from one concentration to a relatively weakened concentration and having substantially uniform distributions in directions transverse to direction of field concentration, positioning each of said balls of top within said measurement region with one end in the field flux of strongest concentrations, measuring capacitivities between said electrodes, inverting each of said balls of top within said region to place the opposite end in said flux field of strongest concentrations, measuring capacitivities between said electrodes with said balls of wool top inverted, and averaging the two measured capacitivities for each of said balls of top, whereby to characterize the moisture content of each of said balls of top substantially independently of density thereof.

12. A capacitive test cell adapted to receive quantities of dielectric substance of different densities and to be coupled into a measurement system for evaluation of dielectric characteristics of said substance, comprising first and second electrodes having conductive surfaces supported in spaced insulated relationship to one another for developing non-uniform concentrations of the flux field through two different parts of the space therebetween, the conductive surface of said first electrode being disposed proximately with a first of said parts of said space and the conductive surface of said second electrode being disposed proximately with the second of said parts of said space, said conductive surface of said first electrode being smaller than that of said second electrode and thereby developing a more concentrated flux field through said first part of said space than in said second part of said space, means for mounting a sample of said substance in said space and orienting a portion of said sample to fill said first part of said space and orienting the remainder of said sample to occupy a volume of said second part of said space which is less than the volume of said first part and varies with the sizes of samples of said substance, the volumes of said parts of said space and the different field flux concentrations in said parts of said space together developing a substantially fixed capacitivity of said cell with different samples of said substance in said space having the same weight and the same composition and different size within a predetermined range of sizes, and means for coupling said electrodes into a frequency controlling circuit in said measurement system.

13. A capacitive test cell adapted to receive quantities of dielectric substance of different densities and to be coupled into a measurement system for evaluation of dielectric characteristics of said substance, comprising first and second electrodes having electrically conductive surfaces, means supporting said electrodes in insulated relationship to one another with said electrically conductive surfaces thereof spaced apart and developing a flux field therebetween which occupies a space larger than and including a void measurement region accommodating a quantity of said substance, said supporting means spacing said conductive surfaces apart with relative orientations which propagate lines of field flux between the conductive surface area of said first electrode and the conductive surface area of said second electrode in different concentrations in different parts of said measurement region and in uniform distributions in planes transverse to the direction of change in said concentrations, means for positioning a sample of said substance in said measurement region with a portion of said sample filling a fixed volume of one of said parts of said region and with the remainder of said sample extending in the said direction of change in said concentrations and occupying a volume of another of said parts which varies with the sizes of samples of said substance having a given weight, said fixed volume and the field flux concentration therein and said other volume and the different field flux concentration therein together developing substantially fixed capacitivity of said cell with different samples of said substance in said measurement region having the same weight and the same composition and different size within a predetermined range of sizes, and means for coupling said electrodes into a frequency controlling circuit in said measurement system.

14. A capacitive test cell as set forth in claim 13 wherein the volume of said other of said parts of said measurement region occupied by the sample is less than the volume of said fixed volume of said one of said parts of said region, and wherein the spacing of said electrode surfaces between which said one of said parts of said region extends is larger than the spacing of said electrode surfaces between which said other of said parts of said region extends, whereby said lines of field flux are less concentrated in said one of said parts of said region than in the other of said parts of said region.

15. A capacitive test cell as set forth in claim 14 adapted to receive quantities of finely-divided particles of the substance, wherein said supporting means positions said electrodes substantially vertically with the larger spacing therebetween lowermore, the portions of said electrode surfaces lying in the same horizontal plane being parallel to one another to propagate said lines of field flux in said uniform distributions, whereby said particles gravitate to fill said fixed volume of said one of said parts of said measurement region and the variations in volume of said sample in said other part of said measurement region occur in a vertical direction perpendicular to horizontal lines of said field flux.

16. A capacitive test cell adapted to receive quantities of dielectric substance of different densities and to be coupled into a measurement system for evaluation of dielectric characteristics of said substance, comprising first and second electrodes having electrically conductive surfaces, the area of said surface of said first electrode being smaller than the area of said surface of said second electrode, means supporting said electrodes in insulated relationship to one another with said electrically conductive surfaces thereof spaced apart and developing a flux field therebetween which is non-uniform in concentration and which occupies a space larger than and including a void measurement region accommodating a quantity of said substance, whereby the flux field concentration is greater in the part of said measurement region nearer said first electrode than in the part of said measurement region nearer said second electrode, said supporting means supporting said electrodes with said conductive surfaces thereof spaced substantially symmetrically about an axis parallel with the direction of flux field concentration to promote substantially uniform field flux distributions in directions transverse to said direction of flux field concentration in said measurement region, means for positioning a sample of said substance in said measurement region with a portion of said sample filling a fixed volume of one of said parts of said region and with the remainder of said sample occupying a volume of another of said parts which varies with the sizes of samples of said substance having a given weight, said fixed volume and the flux field concentration therein and said other volume and the different flux field concentration therein together developing a substantially fixed capacitivity of said cell with different samples of said substance in said measurement region having the same weight and the same composition and different size within a predetermined range of sizes, and means for coupling said electrodes into a frequency controlling circuit in said measurement system.

17. A capacitor test cell adapted to receive dielectric substances of different densities within a predetermined range of sizes and to be coupled into a moisture content measurement system, comprising first and second capacitor electrodes having conductive electric flux generating surfaces of different areas, means mounting said surfaces in spaced insulated relationship to one another with the smaller of said surfaces in a lower position and shaped to support each of said substances proximately therewith in a predetermined measurement region intermediate said electrodes, means for positioning each of said substances within said measurement region, said electrode surfaces having peripheral portions all of which extend beyond said measurement region with said area of said smaller surface being proportioned in relation to the area of said larger surface by an amount occasioning a certain concentration of said flux within the lower part of said measurement region in the vicinity of said smaller surface and a relatively weakened concentration of said flux in the upper part of said measurement region in the vicinity of said larger surface, said mounting means mounting said electrode surfaces symmetrically in relation to said measurement region therebetween to promote substantially uniform field flux distributions through said region in substantially horizontal planes transverse to direction of field flux concentration in said measurement region, and means for coupling said electrodes for electrical excitation by and control in a frequency controlling circuit in said measurement system.

References Cited in the file of this patent

UNITED STATES PATENTS

| | | |
|---|---|---|
| 2,422,742 | Odessey | June 24, 1947 |
| 2,523,363 | Gehman | Sept. 26, 1950 |
| 2,693,575 | Greenwood et al. | Nov. 2, 1954 |
| 2,724,798 | Hare et al. | Nov. 22, 1955 |

FOREIGN PATENTS

| | | |
|---|---|---|
| 647,990 | Great Britain | Dec. 29, 1950 |